United States Patent
Aglietti et al.

(10) Patent No.: US 6,567,907 B1
(45) Date of Patent: May 20, 2003

(54) AVOIDING MAPPING CONFLICTS IN A TRANSLATION LOOK-ASIDE BUFFER

(75) Inventors: Robert Bruce Aglietti, San Jose, CA (US); Kenneth Mark Wilson, San Jose, CA (US); Thomas Lee Watson, Dallas, TX (US)

(73) Assignee: Hewlett-Packard Development Company L.P., Houston, TX (US)

( * ) Notice: Subject to any disclaimer, the term of this patent is extended or adjusted under 35 U.S.C. 154(b) by 306 days.

(21) Appl. No.: 09/691,973

(22) Filed: Oct. 19, 2000

(51) Int. Cl.[7] .............................. G06F 12/00
(52) U.S. Cl. .................. 711/206; 711/203; 711/216; 711/220
(58) Field of Search .................. 711/3, 200–207, 711/216; 707/8

(56) References Cited

U.S. PATENT DOCUMENTS

| | | | | |
|---|---|---|---|---|
| 5,265,245 A | * | 11/1993 | Nordstrom et al. | 707/8 |
| 5,530,958 A | * | 6/1996 | Agarwal et al. | 711/3 |
| 5,928,352 A | * | 7/1999 | Gochman et al. | 712/200 |
| 6,079,004 A | * | 6/2000 | Liedtke | 711/207 |
| 6,418,521 B1 | * | 7/2002 | Mathews et al. | 711/207 |
| 6,430,667 B1 | * | 8/2002 | Loen | 711/202 |

* cited by examiner

Primary Examiner—Do Hyun Yoo
Assistant Examiner—Nasser Moazzami

(57) ABSTRACT

A computer system with mechanisms for avoiding mapping conflicts in a translation look-aside buffer. A memory manager in the computer system allocates a virtual address to a process by determining a set of previously allocated virtual addresses for the process and selecting the virtual address such that the mapping of the virtual address to the translation look-aside buffer does not conflict with any of the previously allocated virtual addresses.

16 Claims, 4 Drawing Sheets

AVOIDING MAPPING CONFLICTS IN A TRANSLATION LOOK-ASIDE BUFFER

BACKGROUND OF THE INVENTION

1. Field of Invention

The present invention pertains to the field of computer systems. More particularly, this invention relates to translation look-aside buffers in computer systems.

2. Art Background

A computer system typically includes a processor and a main memory. The main memory of a computer system usually stores instructions and data. A processor typically has a processor architecture which provides a virtual address space for referencing instructions and data. The main memory, on the other hand, usually has a memory architecture which provides a physical address space for storing instructions and data. Typically, the physical address space of a main memory is much smaller than the virtual address space of a processor. In addition, the physical address space of a main memory may have discontinuities in its ranges of valid addresses.

Computer systems commonly include address translation mechanisms for translating the virtual addresses used by a processor to the appropriate physical addresses for accessing a main memory. An address translation mechanism typically includes a page directory which is stored in main memory. A typical page directory includes a set of entries each of which contains a set of address translation information.

In addition, prior computer systems commonly include one or more translation look-aside buffers (TLBs). A typical TLB holds a subset of the translation information contained in the page directory. A typical TLB may be viewed as a cache of the page directory entries. TLBs usually enhance the speed of a processor by avoiding main memory accesses to the page directory during translation of virtual addresses to physical addresses.

It is usually desirable that a TLB be implemented using a relatively simple structure so that the TLB can be read in a single processor cycle or relatively few processor cycles, thereby enhancing processor performance. In addition, a TLB with a relatively simple structure usually reduces hardware costs associated with a computer system.

An example of relatively simple TLB structure is a direct-mapped structure in which a virtual address maps to its own particular TLB entry. Unfortunately, such direct mapping usually means that the address translation information for virtual addresses that map to the same TLB entry cannot be held in the TLB at the same time. Virtual addresses that map to the same TLB entry are said to have a mapping conflict. Such mapping conflicts in a TLB usually increase the miss rate to the TLB and slow overall performance in a computer system.

SUMMARY OF THE INVENTION

A computer system is disclosed with mechanisms for avoiding mapping conflicts in a translation look-aside buffer. A memory manager in the computer system allocates a virtual address to a process by determining a set of previously allocated virtual addresses for the process and then selecting the virtual address such that the mapping of the virtual address to the translation look-aside buffer does not conflict with any of the previously allocated virtual addresses.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
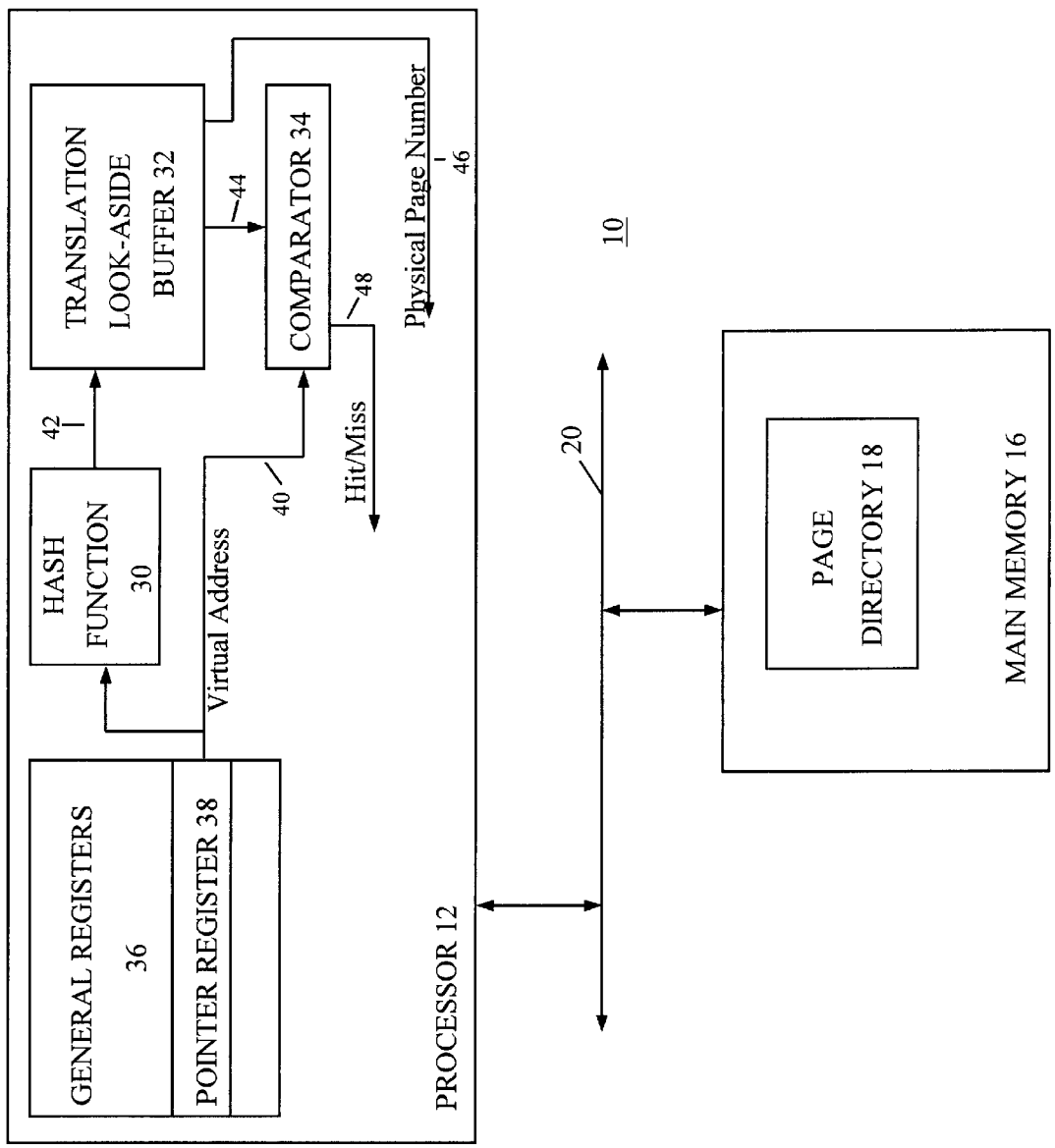
FIG. 1 shows a computer system that includes mechanisms for avoiding mapping conflicts in a translation look-aside buffer according to the present techniques.

FIG. 1 shows a computer system 10 that includes mechanisms for avoiding mapping conflicts in a translation look-aside buffer 32 according to the present techniques. The computer system 10 includes a processor 12 and a main memory 16 that communicate via a bus 20.

The main memory 16 holds a page directory 18. The page directory 18 includes multiple entries each of which holds a set of address translation information for translating virtual addresses used by the processor 12 into physical addresses of the main memory 16. In one embodiment, memory allocation in the computer system 10 is arranged into pages and each set of address translation information contained in the page directory 18 corresponds to a virtual page number and specifies a physical page number.

The translation look-aside buffer 32 caches address translation information obtained from the page directory 18 and enables translations from the virtual addresses used by the processor 12 into physical addresses of the main memory 16. In one embodiment, each entry in the translation look-aside buffer 32 includes a physical page number and a tag that specifies a corresponding virtual page number.

A set of address translation information is read from the translation look-aside buffer 32 by applying an index 42. The index 42 is generated by a hash function 30 in response to a virtual address 40. For example, the virtual address 40 may be obtained from a pointer register 38 of a set of general registers 36 in the processor 12. The pointer register 38 may contain an instruction pointer or a data pointer.

The index 42 is an address input to the translation look-aside buffer 32 and causes one of the entries of the translation look-aside buffer 32 to be read out. In one embodiment, the hash function 30 provides a location via the index 32 of a sought entry in the translation look-aside buffer 32 much like a direct-mapped cache. This enables a reduction in the complexity of circuitry that is implemented in the translation look-aside buffer 32 and increases the speed of reading the translation look-aside buffer 32. In other embodiments, an associative structure may be used to implement the cache in the translation look-aside buffer 32.

The address translation information read out of a selected entry of the translation look-aside buffer 32 includes a set of tags 44 and a physical page number 46. A comparator 34 compares the tags 44 with a virtual page number portion of the virtual address 40. If the tags 44 match the virtual page number portion of the virtual address 40 then a hit/miss indicator 48 indicates a "hit" and the physical page number 46 read out from the translation look aside buffer 32 is used by the processor 12. Otherwise, the hit/miss indicator 48 indicates a "miss" and the missing address translation information is fetched from the page directory 18.

The hash function 30 is a mapping function that associates the value of the virtual address 40 to the value of the index 42. A pair of virtual addresses are said to have a mapping conflict if the hash function 30 generates the same value for the index 42 for both of the virtual addresses. In one embodiment, the translation look-aside buffer 32 is organized as a direct-mapped cache which cannot concurrently hold the address translation information for virtual pages having a mapping conflict.

Figure 2:
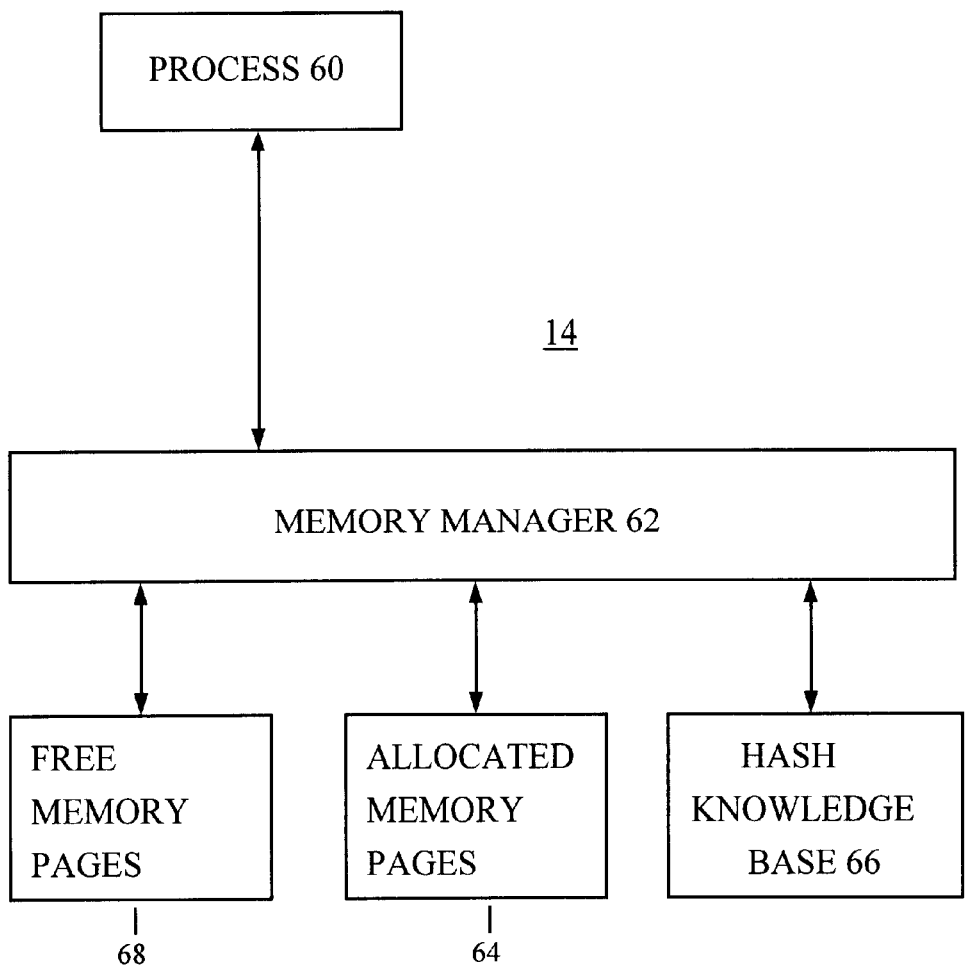
FIG. 2 shows a set of software elements of a computer system including a memory manager that allocates memory to a process.

FIG. 2 shows a set of software elements 14 of the computer system 10 in one embodiment. The software elements 14 include a process 60 and a memory manager 62. The process 60 generates requests to obtain allocations of memory in the computer system 10. The process 60 may, for example, be an application program, a driver program, a system task, etc.

The memory manager 62 allocates memory in the computer system 10 in response to the requests including requests from the process 60. In one embodiment, the memory manager 62 is part of an operating system implemented in the computer system 10.

The memory manager 62 maintains a pool of free memory pages 68 which indicates the virtual memory pages in the computer system 10 that are available for allocation. The memory manager 62 also maintains a pool of allocated memory pages 64 which indicates the virtual memory pages that are currently allocated to the process 60. The memory manager 62 may maintain a separate pool of allocated memory addresses for each process executing on the computer system 10 that requests memory allocation.

In response to a request for memory allocation from the process 60, the memory manager 62 uses the information contained in the pool of allocated memory pages 64 and information contained in a hash knowledge base 66 to select one or more memory pages from the pool of free memory pages 68 for allocation to the process 60. The hash knowledge base 66 provides the memory manager 62 with the information on the characteristics of the hash function 30. The information in the hash knowledge base 66 and the information in the pool of allocated memory pages 64 enables the memory manager 62 to select memory pages that are unlikely to have mapping conflicts in the translation look-aside buffer 32.

Figure 3:
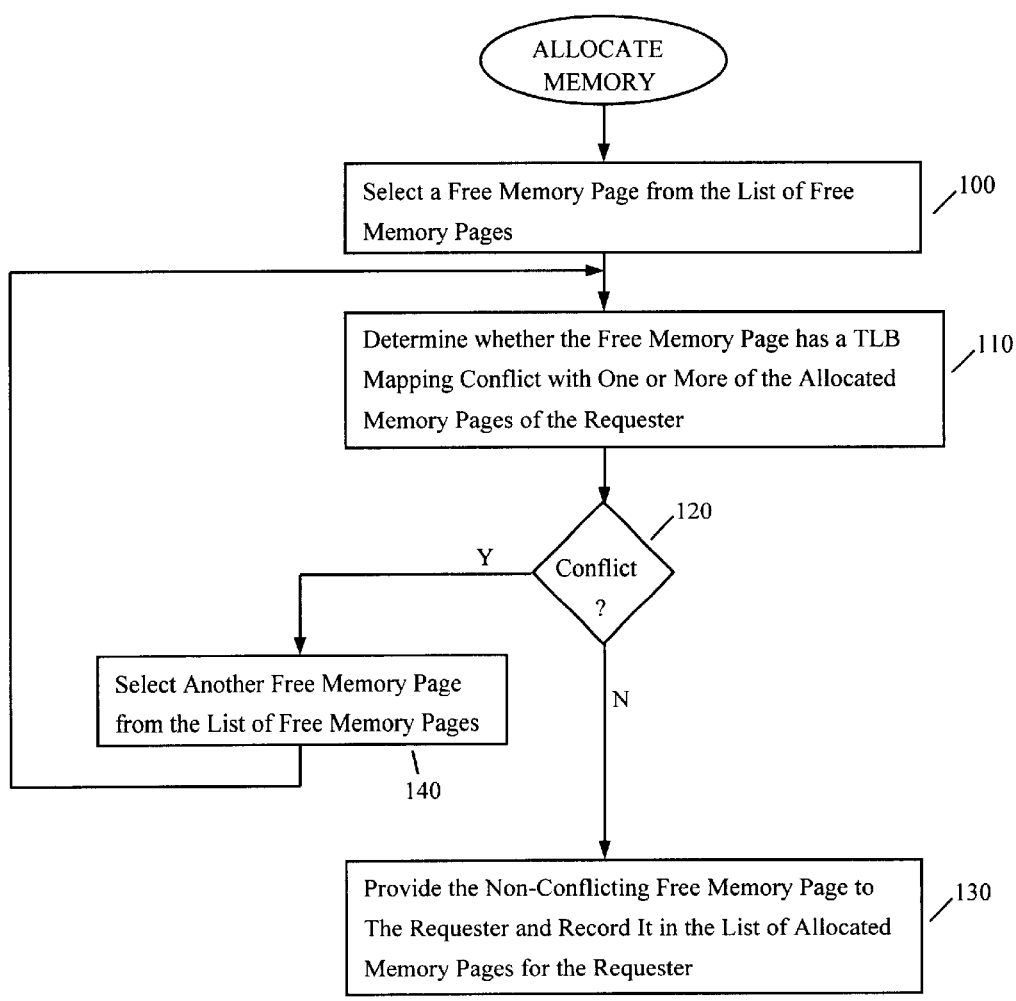
FIG. 3 shows the handling of a request for memory allocation by a memory manager in one embodiment.

FIG. 3 shows the handling of a request for memory allocation by the memory manager 62. In this example, the process 60 as the requester generates the request for memory allocation.

At step 100, the memory manager 62 selects a free memory page from the pool of free memory pages 68. The memory manager 62 may employ any method for maintaining the pool of free memory pages 68 and for selecting a free memory page at step 100.

At step 110, the memory manager 62 determines whether the selected free memory page has a mapping conflict with one or more of the memory pages already allocated to the requester. In this example, the requester is the process 60 and the memory manager 62 determines whether there is a mapping conflict by applying the hash function 30 to the selected free memory page and applying the hash function 30 to each memory page in the pool of allocated memory pages 64. A mapping conflict exists if any of the memory pages in the pool of allocated memory pages 64 yield the same index value as that yielded by the selected free memory page when the hash function 30 is applied.

The memory manager 62 uses the hash knowledge base 66 to apply the hash function 30. For example, the hash knowledge base 66 may indicate that the hash function 30 generates the index 42 by truncating a set of preselected bits from a virtual page number portion of the virtual address 40. At step 110, the memory manager 62 mimics the truncation performed by the hash function 30 when detecting mapping conflicts. This is only one example of a hash function and numerous others are possible.

If a TLB mapping conflict is detected at step 120, then at step 140 another free memory page is selected from the pool of free memory pages 68. Thereafter, the memory manager 62 loops back to step 110 and determines whether the newly selected free memory page has a mapping conflict as previously described.

Otherwise, at step 130 the memory manager 62 provides the non-conflicting free memory page obtained at step 100 or step 140 to the requester which in this case is the process 60. The memory manager 62 also records the non-conflicting free memory page in the pool of allocated memory pages 64 at step 130.

The pool of allocated memory pages 64 may hold the virtual addresses or the virtual page numbers of the memory pages allocated to the process 60. Alternatively, other representations may be used.

The hash knowledge base 66 may contain any representation of the hash function 30. For example, the hash knowledge base 66 may represent the hash function 30 with a numerical expression or with a lookup table, etc.

The hash function 30 may be implemented with a hash table—for example an array of memory, possibly static random access memory (SRAM) formed on the same integrated circuit die that contains other elements of the processor 12.

The technique disclosed above for selecting non-conflicting memory pages takes advantage of the fact that the virtual address space of the processor 12 is relatively large in comparison to the typical memory requirements of the software that it executes. This provides a large selection of available virtual addresses and enables the virtual address of newly allocated memory pages to be chosen in such a way as to avoid address mapping conflicts in the translation look-aside buffer 32. With the present techniques for avoiding mapping conflicts in a TLB a process does not cause eviction of its own address translation information unless its own address translation information has taken up a relatively large number of the entries in the TLB.

The address translation information for the process 60 that is contained within the translation look-aside buffer 32 may be saved and restored along with the context switch of the process 60.

The translation look-aside buffer 32 may be implemented as a direct mapped cache structure or as a cache structure having some level of associativity. For example, a 2 way set associative TLB with a hash function may be used to hold address translation information for both an executing process and for an operating system of the computer system 10.

The translation look-aside buffer 32 may contain address translation information associated with a data space of the processor 12. Alternatively, the translation look-aside buffer 32 may contain address translation information associated with an instruction space of the processor 12.

Figure 4:
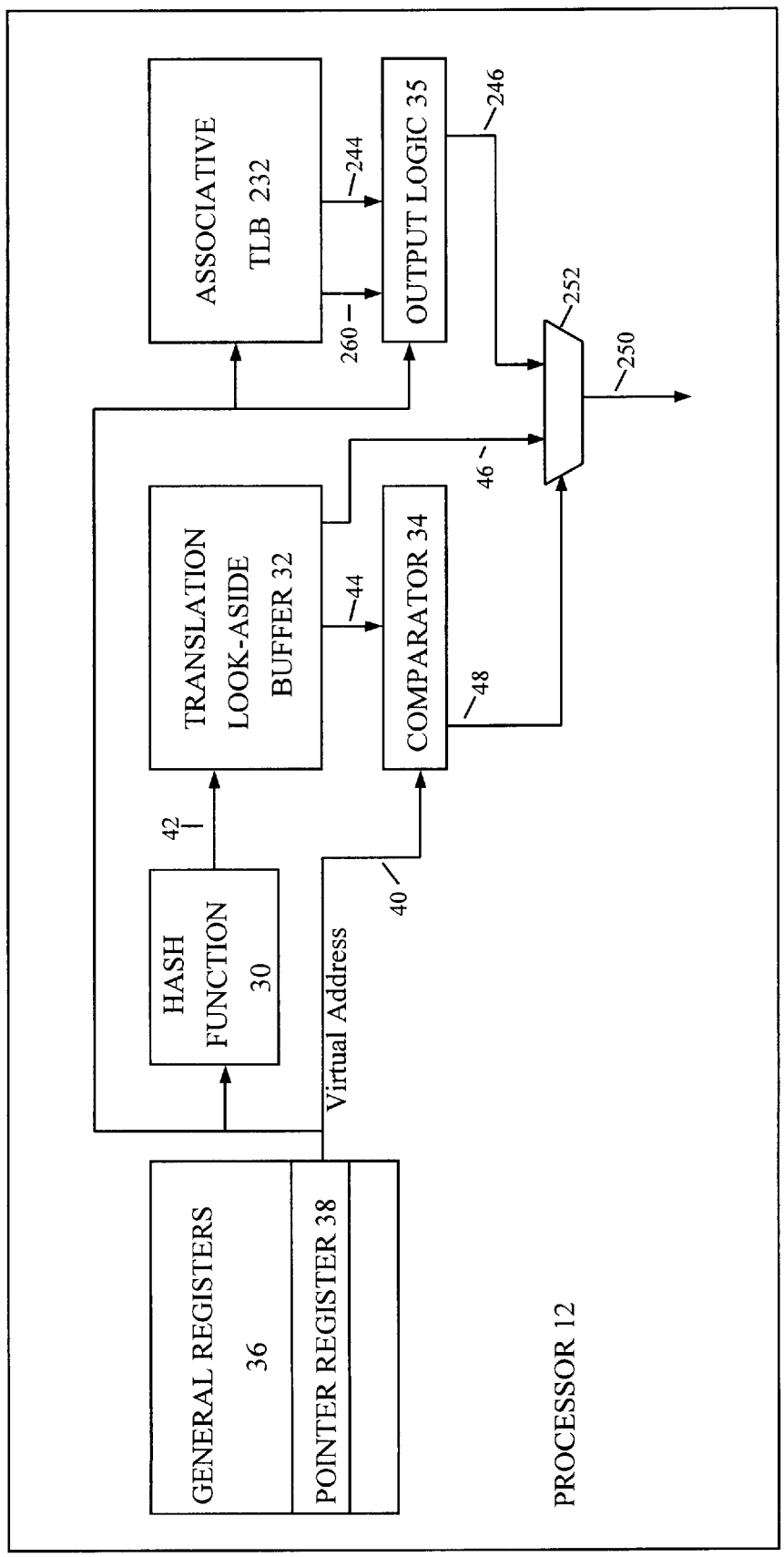
FIG. 4 shows an embodiment in which a processor includes a translation look-aside buffer with a hash function along side a separate associative TLB both of which are accessed in parallel.

FIG. 4 shows an embodiment in which the processor 12 includes the translation look-aside buffer 32 with its hash function 30 along side a separate associative TLB 232 both of which are accessed in parallel. The associative TLB 232 reads out sets of tags 244 and data 260 in response to the virtual address 40 and a set of output logic 35 selects an output data 246 on a hit to the associative TLB 232. The hit/miss indicator 48 controls a multiplexor 252 which selects the output data 246 when a miss occurs to the translation lookaside buffer 32.

The parallel associative TLB 232 may be used to provide for the possibility that the memory manager 62 may not be able to find a page which does not conflict with the pages already allocated. In order to make more efficient use of the hardware of the computer system 10, the memory manager may provide the hardware with hint information that directs new mappings to be stored in the direct-mapped translation look-aside buffer 32 in the case that the new mapping does not conflict with prior mappings and in the parallel associative TLB 232 in the case that the mapping does conflict.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer system, comprising:
   translation look-aside buffer for holding a set of address translation information such that at least one entry in the translation look-aside buffer maps to multiple virtual addresses in the computer system; and
   memory manager that allocates a virtual address to a process by determining a set of previously allocated virtual addresses for the process and selecting the virtual address such that the virtual address does not have a mapping conflict in the translation look-aside buffer with any of the previously allocated virtual addresses.

2. The computer system of claim 1, further comprising a hash function that generates an index into the translation look-aside buffer in response to the virtual address.

3. The computer system of claim 2, wherein the hash function generates the index in response to a virtual page number portion of the virtual address.

4. The computer system of claim 2, wherein the memory manager selects the virtual address in response to a pool of the previously allocated virtual addresses.

5. A computer system, comprising:
   translation look-aside buffer for holding a set of address translation information;
   memory manager that allocates a virtual address to a process by determining a set of previously allocated virtual addresses for the process and selecting the virtual address such that the virtual address does not have a mapping conflict in the translation look-aside buffer with any of the previously allocated virtual addresses; and
   hash function that generates an index into the translation look-aside buffer in response to the virtual address wherein the memory manager selects the virtual address in response to a pool of the previously allocated virtual addresses and the memory manager determines whether the virtual address conflicts with any of the previously allocated virtual addresses by applying the hash function to the virtual address and to each previously allocated virtual address in the pool.

6. A computer system, comprising:
   translation look-aside buffer for holding a set of address translation information; and
   memory manager that allocates a virtual address to a process by determining a set of previously allocated virtual addresses for the process and selecting the virtual address such that the virtual address does not have a mapping conflict in the translation look-aside buffer with any of the previously allocated virtual addresses wherein the translation look-aside buffer functions is a direct-mapped translation look-aside buffer.

7. The computer system of claim 6, further comprising an associative translation look-side buffer that operates in parallel with the direct-mapped translation look-aside buffer.

8. The computer system of claim 7, wherein the memory manager allocates the virtual address to be stored in the associative translation-look-aside buffer if the virtual address conflicts with one or more of the previously allocated virtual addresses.

9. A method for avoiding mapping conflicts in a translation look-aside buffer, comprising the steps of:
   determining a set of previously allocated virtual addresses for a process; and
   selecting a virtual address for the process such that the virtual address does not have a mapping conflict in the translation look-aside buffer with any of the previously allocated virtual addresses wherein at least one entry in the translation look-aside buffer maps to multiple virtual addresses.

10. The method of claim 9, further comprising the step of generating an index into the translation look-aside buffer in response to the virtual address using a hash function.

11. The method of claim 10, wherein the step of generating an index comprises the step of generating the index in response to a virtual page number portion of the virtual address.

12. The method of claim 10, wherein the step of selecting a virtual address comprises the step of selecting the virtual address in response to a pool of the previously allocated virtual addresses.

13. A method for avoiding mapping conflicts in a translation look-aside buffer, comprising the steps of:
   determining a set of previously allocated virtual addresses for a process;
   selecting a virtual address for the process such that the virtual address does not have a mapping conflict in the translation look-aside buffer with any of the previously allocated virtual addresses; and
   generating an index into the translation look-aside buffer in response to the virtual address using a hash function wherein the step of selecting a virtual address comprises the steps of selecting the virtual address in response to a pool of the previously allocated virtual addresses and determining whether the virtual address conflicts with any of the previously allocated virtual addresses by applying the hash function to the virtual address and to each previously allocated virtual address in the pool.

14. A method for avoiding mapping conflicts in a translation look-aside buffer, comprising the steps of:
   determining a set of previously allocated virtual addresses for a process; and
   selecting a virtual address for the process such that the virtual address does not have a mapping.conflict. in the translation look-aside buffer with any of the previously allocated virtual addresses.wherein the translation look-aside buffer functions is a direct-mapped translation look-aside buffer.

15. The method of claim 14, further comprising the step of operating an associative translation look-side buffer in parallel with the direct-mapped translation look-aside buffer.

16. The method of claim 15, further comprising the step of allocating the virtual address to be stored in the associative translation-look-aside buffer if the virtual address conflicts with one or more of the previously allocated virtual addresses.

* * * * *